United States Patent [19]

Cebula et al.

[11] Patent Number: 5,147,670
[45] Date of Patent: Sep. 15, 1992

[54] EDIBLE FAT-BASED FILMS

[75] Inventors: Deryck J. Cebula, Eaton Sogon; John P. Pierce, Rushden Northants, both of Great Britain

[73] Assignee: Lever Brothers Company, Division of Conopco, Inc., New York, N.Y.

[21] Appl. No.: 557,345

[22] Filed: Jul. 25, 1990

[30] Foreign Application Priority Data

Jul. 25, 1989 [EP] European Pat. Off. ......... 89201945.6
Jun. 21, 1990 [EP] European Pat. Off. ......... 90201634.4

[51] Int. Cl.$^5$ ............................ A23D 9/06; A23P 1/08
[52] U.S. Cl. ........................................ 426/98; 426/99; 426/310; 426/330.6
[58] Field of Search ................... 426/99, 98, 310, 302, 426/138, 330.6

[56] References Cited

U.S. PATENT DOCUMENTS 2,886,438 5/1959 Barsky et al. .
3,479,191 11/1969 Cole .
3,600,186 6/1971 Mattson et al. .
4,137,334 1/1979 Heine ................... 426/310
4,880,657 11/1989 Guffey et al. .
4,919,964 4/1990 Adams et al. .
4,960,600 10/1990 Kester ................... 426/98

FOREIGN PATENT DOCUMENTS 0236288 9/1987 European Pat. Off. .
0271951 6/1988 European Pat. Off. .
0285187 10/1988 European Pat. Off. .
0290420 11/1988 European Pat. Off. .
1403293 5/1965 France .
6220573 8/0000 Japan .

OTHER PUBLICATIONS

Fette, Seifen, Anstrichmittel 80(5), 180–186 (1978).
Emulsions: Theory and Practice, p.2 (New York).

Primary Examiner—Carolyn Paden
Attorney, Agent, or Firm—Gerard J. McGowan, Jr.

[57] ABSTRACT

The present invention pertains to edible diffusion-retarding fat-based films for food products based upon a blend of one or more polyol fatty acid polyesters. The films are particularly suitable for filled confectioneries.

8 Claims, No Drawings

EDIBLE FAT-BASED FILMS

BACKGROUND OF THE INVENTION

The present invention relates to edible diffusion-retarding fat-based films for food products.

In many food products, and in particular composite food products, such as coated, layered or filled products fat- and moisture-migration or diffusion upon storage from one food material to an adjacent food material causes product degradation due to the deleterious effects by the migrating material or component upon the appearance, the consistency, the microbiological or chemical stability and/or the flavour balance of the intruded or intruding material.

Accordingly, migration and diffusion effects provide a principal difficulty in terms of structural and compositional freedom and consumer acceptability. Food products suffering from degradation due to such migration or diffusion phenomena may be found in every food industry area where products are encountered requiring long-term physical separation of food materials from each other or environment.

Examples of diffusion-sensitive food products are encountered e.g. in the bakery industries, such as with baking mixes comprising fresh nut or fruit pieces, meat-filled pastries, pizzas, snack products and toasts, and in the confectionery, chocolate and dairy industries such as filled chocolates, in particular pralines, coated or wavered ice-creams, liquid-filled candy bars, cream-filled biscuits and the like.

In general the greater the difference in the fat or moisture content or in the type of fat between the adjacent food materials, the greater the risk of fat- or moisture-migration upon storage will be.

In the art the above problems of migration or diffusion into or between food materials have been approached by modification or adjustment of the food materials themselves, or by applying to or in-between adjacent food materials a film of an edible material more resistent to migration or diffusion, thereby slowing down deterioration of the food product upon storage.

In the area of bakery and confectionery products the use of triglyceride fats as, in particular, moisture barriers is known. Although dependent upon the storage temperatures involved generally barrier fats have a relatively high solids content at the storage temperature of the product, and comprise sufficient hardstock fat to provide a firm structure of the layer. Often in the application of such barrier fats a not always fully satisfactory compromise must be found between barrier efficiency on the one hand and layer thickness (or number of layers) and taste aspects on the other hand. An additional problem frequently encountered with particularly low-temperature applications of fat-based barrier layers is that of cracking of the barrier layer upon storage resulting in decreased barrier efficiency. Prior art hitherto has not provided a fully adequate solution.

SUMMARY OF THE INVENTION

It has now been found that the use of fat-based films or barrier layers which include considerable amounts of polyol fatty acid polyesters provide a very good protection to fat and moisture migration, polyol fatty acid polyesters showing good cracking behaviour upon storage over a wide range of temperatures. The fat-like properties of polyol fatty acid polyesters allows application in a wide variety of food products, the improved barrier behaviour providing an improved shelf-life by the increased resistance for prolonged periods of time against fat and moisture migration.

The polyol fatty acid polyester based films are particularly useful for confectionery applications where fat migration is prohibitive to satisfactory product formulation as also for applications involving cold or frozen storage conditions, such as composite or coated ice-cream products.

Accordingly, in its broadest aspect the present invention provides an edible diffusion-retarding fat-based film for food products the fat component of said film comprising 50 to 100% by weight of a blend of one or more polyol fatty acid polyesters.

In a further aspect the present invention provides food products comprising an edible diffusion-retarding fat-based film, the fat component of said film comprising 50 to 100% by weight of a blend of one or more polyol fatty acid polyesters.

In still a further aspect the present invention provides composite food products comprising two or more food materials physically separated by an edible diffusion-retarding fat-based film, the fat component of said film comprising 50 to 100% by weight of a blend of one or more polyol fatty acid polyesters.

In a specific aspect the present invention provides composite food products comprising a material comprising a continuous fat-phase and a material sensitive to fat-migration separated by an edible diffusion-retarding fat-based film, the fat component of said film comprising 50 to 100% by weight of a blend of one or more polyol fatty acid polyesters.

In a further specific aspect the present invention provides the use of a blend of one or more polyol fatty acid polyesters as fat-migration retarding component in edible fat-based films for composite food products.

In an alternative specific aspect the present invention provides composite food products comprising water-continuous and a moisture-sensitive material separated by an edible diffusion-retarding fat-based film, the fat component of said film comprising 50 to 100% by weight of a blend of one or more polyol fatty acid polyesters.

DETAILED DESCRIPTION OF THE INVENTION

The application of polyol fatty acid polyesters as fat-replacers in low-calorie food products and as crystal-modification agents have been described in e.g. U.S. Pat. No. 3,600,186, JP 62/205738, U.S. Pat. No. 2,886,438, EP 0 236 288, EP 0 271 951 and EP 0 290 420. Coating of fresh fruits and vegetables with a composite film on the basis of carboxymethyl cellulose and sucrose fatty acid esters have been described in an article by Lowings and Cutts in Proc. Inst. Food Sci. Tech. Ann. Symp., page 52 of July 1981.

These publications do not describe or suggest the application of polyol fatty acid polyesters in diffusion-retarding films.

The polyol fatty acid polyesters employed in the present invention are fatty acid polyesters derived from aliphatic compounds which comprise at least four free hydroxyl groups. Such polyols in particular include the group of sugar polyols, which comprises the sugars, i.e. the mono-, di- and polysaccharides, the corresponding sugar alcohols and the derivatives thereof having at least four free hydroxyl groups Examples of the preferred sugar polyols include glucose, mannose, galactose, xylose, fructose, sorbose, tagatose, ribulose, xylulose, maltose, lactose, cellobiose, raffinose, sucrose, erythritol, mannitol, lactitol, sorbitol, xylitol and α-methylglucoside. The sucrose polyol is preferred most.

The degree of conversion to polyester, which is defined as the percentage of polyol hydroxyl groups that, on an average, have been esterified with fatty acids, should be 70% or more, and preferably is 85 or even 95% or more.

In general, and preferably in view of resistance to enzymatic degradation, polyol fatty acid polyesters having the high degrees of conversion in accordance with the invention, are selected from indigestible polyesters. For the purposes of the invention by indigestibility is meant that about 70% by weight or more of the material concerned is not digested by the human body.

Suitable blends of one or more polyol fatty acid polyesters for use in the fat-based films in accordance with the present invention are characterised by a N-line which corresponds to a relatively high solids content at the temperature range of normal storage, but of relatively low or zero solids contents at mouth temperature, a $N_{storage}$ of 50 to 100 has been found suitable, a $N_{storage}$ of 60 to 95 being preferred.

In this specification the $N_{storage}$-value refers to the N-value at the normal storage temperature of the food product concerned. For the purposes of the present invention it has been found convenient to take the normal storage temperature for films intended for non-frozen applications to be 20° C., for chilled applications to be 5° C. and for frozen applications to be −20° C.

The N-value at mouth temperature of suitable blends of one or more polyol fatty acid polyesters for use in the fat-based film in accordance with the present invention often is selected to be relatively low, in particular in applications where organoleptic characteristics play an important role, and is suitably characterised by an $N_{30}$ of 70 or less, in particular an $N_{30}$ of 50 or less the range of 30 to 50 being most suitable, and an $N_{37}$ of 30 or less in particular an $N_{37}$ of 20 or less, an $N_{37}$ within the range of from 10 to 20 being preferred most. For cold storage applications an $N_{37}$ within the range of from 0 to 10 and in particular within the range of from 0 to 5 are preferred most.

The selection of the appropriate blend of fatty acids in the polyester is determined by the above-specified melting characteristics of the polyol fatty acid polyester, as conveniently defined by its N-line or N-values. The N-line is the graph of $N_t$-values versus the temperature t. The $N_t$-value is conveniently measured by the nuclear magnetic relaxation technique and is a direct measure of the level of solid fat content at temperature t. This method is suitably described in Fette, Seifen, Anstrichmittel 80(5), 180–186 (1978). To some extent the measurement of $N_t$-values is dependent on the temperature profile used to prepare the samples for the NMR-measurement. For the purposes of the present invention the following preparatory temperature profile is adopted: 30 minutes at 60° C., 90 minutes at 0° C. 40 hours at 26° C., again 90 minutes at 0° C. and finally 60 minutes at the temperature of the measurement, after which the NMR measurement is carried out.

Fatty acids per se, lower alkylesters thereof or naturally occurring fats and oils may be used as source for the polyester fatty acids. Conventional techniques may be used to introduce the required fatty acid composition and degree of saturation. Suitable such techniques include hydrogenation interesterification and fractionation, and may be used before or after conversion of the polyols to the corresponding polyol fatty acid polyesters.

Sources of suitable polyester fatty acids blends are vegetable oils, in particular soybean, sunflower, safflower, cottonseed, palm and palm kernel oils. Such oils may be partially or fully hydrogenated, and in optimising to specific product specifications the use of mixtures of, optionally partially or fully hydrogenated oils may be of special advantage.

Instead of a 'single' polyol fatty acid polyester i.e. a polyester which is synthesized from a polyol and a source for the fatty acid residues in a single reaction, also a mixture of polyol fatty acid polyesters may be used provided the overall solids profile of the final blend is in accordance with the present invention.

In this specification the term 'blend' is intended to encompass both a single polyol fatty acid polyester and a mixture of more than one polyol fatty acid polyesters.

The fat component in the film in accordance with the present invention may consist solely of the one or more polyol fatty acid polyester, but also allows mixing with relative small amounts of milk fats or vegetable oils, in particular hydrogenated vegetable oils conventionally used in fat-based film compositions and flavour-introducing oils, such as natural cocoa-butter and nut-oils, such as hazelnut and peanut oils, provided such mixing does not result in a fat component having a solids versus temperature profile outside the range as indicated hereinbefore for the blend of polyesters. If a mixture is considered desirable, the amount of polyester should be in the range of 50 to 100% by weight of the fat component, and preferably is within the range of 75 to 100%. To take full advantage of the improved film characteristics the fat component of the film composition most preferably consists of 90% by weight or more of the blend of polyesters.

The fat component may be the sole component of the film, or it may be the continuous phase of a dispersion, suspension or emulsion. In general the film composition comprises from 20 to 100% of fat component, and preferably comprises from 50 to 100%, and most preferably from 80% to 100% by weight.

In addition to the blend of polyol fatty acid polyesters and optionally further fatty materials the film composition in accordance with the present invention may comprise one or more further film ingredients, in particular colouring and flavouring components.

In food products, such as candy, confectionery and ice-cream products the film composition may further comprise ingredients such as sugar, water, suitable flavouring, in particular cocoa powder chocolate liquor or cocoa mass, or nut or fruit flavourings, milk solids, and emulsifier, such as in particular lecithin, preservatives anti-oxidants, and vitamins, such as vitamin E.

In the manufacture of the food products in accordance with the present invention the film is applied by conventional methods, such as in molten form followed by solidification, in solution in a suitable lipid-dissolving solvent, such as e.g. alcohol, and subsequent removal of the solvent, or as an emulsion followed by drying. Suitably the film is applied by spraying of the film material in molten form onto the food material to be coated or to be physically separated from the further food materials. In the finished food products suitable thickness of the barrier material layer is primarily dictated by method of application and organoleptic considerations. In general the film is applied in a thickness of up to 1 mm, and preferably of from 0.01 to 0.5 mm, a thickness of from 0.02 to 0.05 mm being preferred most.

It is also possible to use the film in accordance with the present invention in a multiple form, i.e. in combination with one or more films on the basis of other materials selected from the group of hydrogenated vegetable oils, in particular hydrogenated palm oil or soybean oils, beeswax, paraffin waxes, proteins such as gelatins, polysaccharides, such as starch, pectin, carrageenan, dextrins and cellulose derivatives, in particular, carboxymethyl cellulose, methyl cellulose, hydroxypropyl methylcellulose and hydroxypropyl cellulose.

The films according to the present invention find particular application in composite confectionery products where physical separation of different fat-based components is important, such as in filled chocolate products having an outer relatively hard chocolate coating and a fat-continuous confectionery centre filling. The films are further in particular applicable in composite confectionery products requiring cold or frozen storage conditions, such as confectionery or chocolate coated composite ice-creams.

The invention is now further illustrated by way of the following example.

EXAMPLE

To test fat-migration in filled confectionery products a so-called washer test set-up was used. In this washer test two types of sucrose fatty acid polyesters were tested on their fat-barrier efficiency. Barrier efficiency was evaluated by way of a penetration test measuring the softening due to mixing of migrating fats, lower penetration values corresponding to less migration.

Penetration test

In a penetration test a needle comprising a shaft culminating in a cone (length—1 cm, tip angle—9°, weight—50 grams) and gripped in a mechanical lock, was first arranged such that its tip was just in contact with the surface of the sample to be tested. The needle was then released for 5 seconds, after which the penetration of the samples by the needle was measured in tenths of a mm. Samples for the penetration test were first stored at 20° C. for 24 hours before the penetration measurement.

Washer test

The testing equipment consisted of two steel washers of 3 mm thickness and 21 mm internal diameter and an in-between 'barrier' washer of 0.5 mm thickness and 21 mm internal diameter. The bottom washer was glued on a perspex base plate and filled with the confectionery filling and levelled off. The barrier washer was then glued on to the filling washer and filled with the barrier material to be tested and levelled off. Subsequently the top washer was attached on top of the barrier washer and filled with the chocolate material of the confectionery filling product. Penetration of the chocolate material was evaluated after storage of the washer set-up at 28° C. for 1, 7, 14 and 28 days.

filled confectionery product

The compositions of the filling and chocolate components of the filled confectionery product were as follows (% by weight):

| chocolate top washer | | filling bottom washer |
| --- | --- | --- |
| icing sugar | 37.5% | 50.0% |
| skimmed milk powder | 24.2% | — |

-continued

| chocolate top washer | | filling bottom washer |
| --- | --- | --- |
| cocoa powder (10–12% fat) | 6.0% | 5.0% |
| hydrogenated palm kernel oil | — | 45.0% |
| chocolate coating fat (*) | 31.9% | — |
| lecithin | 0.4% | — |

(*) non-tempered hydrogenated and fractionated blend of soybean oil and palm oil characterised by a slip melting point of about 34–36° C. and N-values of 84 at 20° C., 55 at 30° C. and <2 at 37° C.

The chocolate was prepared by conventional processing involving mixing, refining by roller mill and conching. The molten chocolate was cooled to about 40° C. before introduction into the top washer and subsequently cooled in a cooling tunnel at 10° to 15° C.

The filling was prepared by simple mixing and the molten filling was introduced into the bottom washer at about 40° C.

Two sucrose fatty acid polyester films were evaluated on their barrier behaviour:

| | |
| --- | --- |
| SPE-1: | sucrose fatty acid polyester derived from a blend of 55% of fully hydrogenated soybean oil (slip melting point 65° C.) and 45% of tough hardened soybean oil (slip melting point 28° C.), the polyester having a degree of conversion of over 95%. N-values of SPE-1: 68 at 20° C., 44 at 30° C. and 17 at 37° C. |
| SPE-2: | sucrose fatty acid polyester derived from a blend of 53% of fully hardened palm kernel oil and 47% of fully hardened palm oil, degree of conversion of over 95%. N-values of SPE-2: 86 at 20° C., 66 at 30° C., 26 at 37° C. |

The results in Table 1 clearly illustrate the diffusion-retarding properties of the polyester films.

TABLE 1

| penetration values of chocolate in mm after storage at 28° C. | | | |
| --- | --- | --- | --- |
| storage time | SPE-1 | SPE-2 | no film |
| 1 day | 5 | 3 | 3 |
| 7 days | 9 | 11 | 14 |
| 14 days | 20 | 15 | 23 |
| 28 days | 38 | 30 | 56 |

What is claimed is:

1. A composite food product comprising two or more fat based components physically separated by an edible fat diffusion-retarding film based on fat which comprises 50 to 100% by weight of a blend of one or more polyol fatty acid polyesters.

2. The food according to claim 1 in which the polyol fatty acid polyesters are the polyester products of polyols selected from the group of sugars, sugar alcohols and sugar derivatives having at least four free hydroxyl groups, and fatty acids derived from partially or fully hydrogenated vegetable oils, having a degree of conversion of 95% or more.

3. The food according to claim 1 in which the blend of one or more polyol fatty acid polyesters has an $N_{storage}$ of 60 to 95, an $N_{30}$ of below 70 and an $N_{37}$ of below 20.

4. The food according to claim 1 in which the fat component of the film comprises of from 70 to 100% by weight of the blend of one more polyol fatty acid polyesters.

5. A composite food product comprising both a material comprising a continuous fat-phase and a material sensitive to fat migration separated by an edible fat diffusion-retarding film based on fat which comprises 50 to 100% by weight of a blend of one or more polyol fatty acid polyesters.

6. A food according to claim 5 in which the polyol fatty acid polyesters are the polyester products of polyols selected from the group of sugars, sugar alcohols, sugar derivatives having at least four free hydroxyl groups, and fatty acids derived from partially or fully hydrogenated vegetable oils, having a degree of conversion of 95% or more.

7. The food according to claim 5 in which the blend of one or more polyol fatty acid polyesters has an $N_{storage}$ of 60 to 95, an $N_{30}$ of below 70 and an $N_{37}$ of below 20.

8. The food according to claim 5 in which the fat component of the film comprises from 70 to 100% by weight of the blend of one or more polyol fatty acid polyesters.

* * * * *